Sept. 15, 1931.   R. J. ARMSTRONG   1,823,777

INSECT TRAP

Filed Feb. 5, 1931

INVENTOR.
Ralph J. Armstrong
BY
Geo. P. Kimmel
ATTORNEY.

Patented Sept. 15, 1931

1,823,777

UNITED STATES PATENT OFFICE

RALPH J. ARMSTRONG, OF MONETT, MISSOURI

INSECT TRAP

Application filed February 5, 1931. Serial No. 513,701.

This invention relates to an insect trap particularly adapted for use in trapping roaches, and has for its primary object to provide, in a manner as hereinafter set forth, a trap of such class in which bait may be contained in a manner to be exposed to the sight and smell of insects in order to induce the latter to enter the trap.

A further object of the invention is to provide a trap of the character aforesaid which includes means to facilitate the entrance of insects thereinto and to prevent the exit of insects therefrom, the trap further having a removable cover to provide for the ready removal of the trapped insects when desired.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views.

Figure 1:
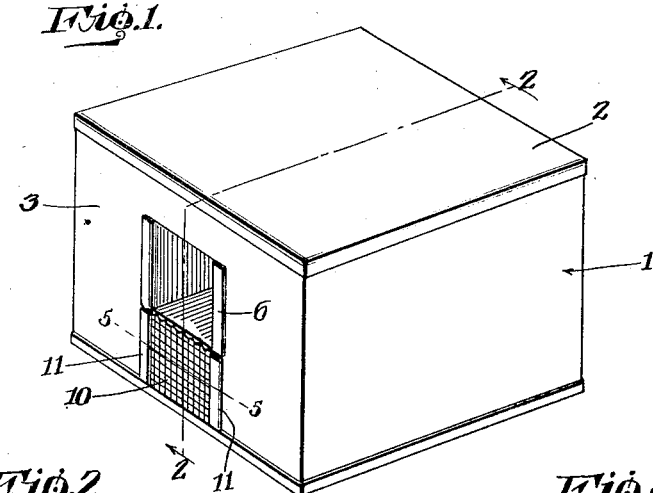
Figure 1 is a perspective view of a trap in accordance with this invention.
Figure 2:
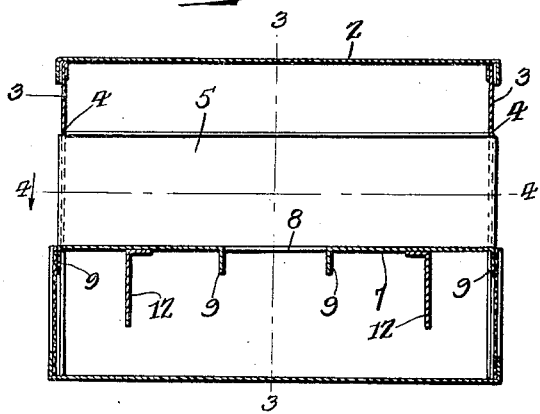
Figure 2 is a vertical section taken on the line 2—2 of Figure 1.
Figure 3:
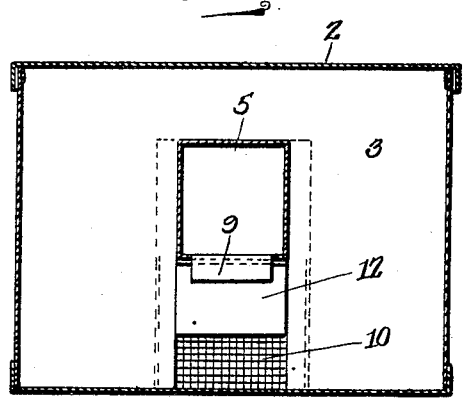
Figure 3 is a vertical section taken at a point indicated by the line 3—3 of Figure 2.
Figure 4:
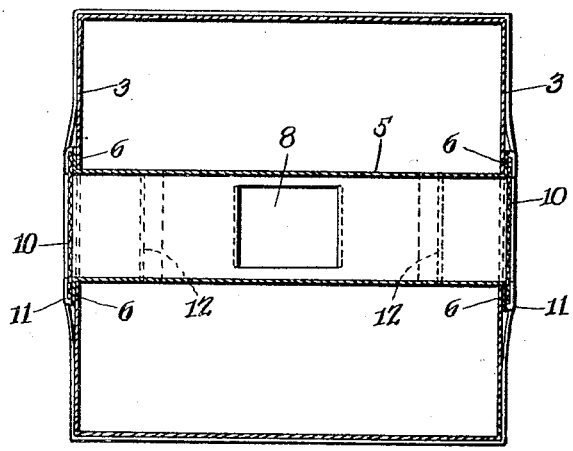
Figure 4 is a horizontal section taken at a point indicated by the line 4—4 of Figure 2.
Figure 5:
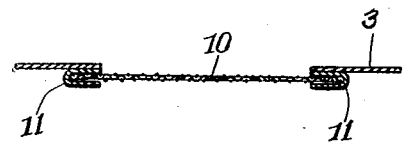
Figure 5 is an enlarged fragmentary section taken at a point indicated by the line 5—5 of Figure 1.

Referring to the drawings in detail, the numeral 1 indicates an open top container preferably of rectangular construction and provided with a removable cover 2. Formed in what will be termed the end walls 3 of the container 1 are rectangular openings 4 which extend from the bottom of the container to a point in spaced relation to the top thereof.

Extending between the walls 3 is a hollow member 5, the ends of which project through the openings 4 and are provided with flanges 6 seating against the outer faces of the walls 3. The member 5 is positioned in a manner to have the ends thereof disposed at the upper ends of the openings 4. Intermediate the ends thereof, the member 5 is provided in its bottom wall 7 with an opening 8 extending substantially throughout the width of the member 5 to provide an interruption to the passage of insects from one end of the member 5 to the other. The bottom 7 is provided adjacent the openings 4, as well as adjacent the transverse edges of the opening 8 with depending flanges 9.

Extending across lower portions of the openings 4 are screens 10 which extend from the bottoms of such openings to points slightly above the bottom wall 7 of the hollow member 5. The screens 10 are secured in position by means of angular strips 11, the folds of which embrace opposite sides of side marginal portions of the screens 10, and which are suitably secured to the outer faces of the walls 3. Depending from the bottom wall 7 of the hollow member 5 are a pair of obstruction plates 12, one of which is disposed in spaced relation to each of the screens 10.

In the use of the trap, any suitable bait is placed within the container 1, such bait being readily exposed to the sight and smell of approaching insects through the screens 10. The screens 10 form means whereby the insects may readily climb into end portions of the hollow member 5, from which they may emerge into the container 1 through the opening 8. If the insects should attempt to return through the opening 8 by first climbing up the screens 10 from inside the trap, thence along the lower face of the bottom wall 7 to the opening 8, the path of the insects will be obstructed by the obstruction plates 12 which cause the insects to fall to the bottom of the container 1. When it is desired to destroy the insects trapped within the container 1, this may be readily accomplished by holding the container over a fire or the like and removing the cover 2. It is to be noted that when the cover 2 is removed, substantially the entire interior of the container 1 is exposed whereby the insects may be readily removed.

It is thought that the many advantages of an insect trap in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. An insect trap comprising, a container to contain bait and having openings in opposing walls thereof, a hollow member extending between said walls and having its ends projecting through said openings in spaced relation to the bottom of the container to provide a passageway through the container, means exteriorly of said walls and beneath the projecting ends of said hollow member to facilitate the entrance of insects into the hollow member, said hollow member having its bottom wall formed with an opening interrupting the passage therethrough and providing an entrance to the interior of the container, and means within the container to prevent the return of the insects through the opening in the bottom wall of the hollow member.

2. An insect trap comprising, a container to contain bait and having openings in opposing walls thereof, a hollow member extending between said walls and having its ends projecting through upper portions of said openings, and screens extending across lower portions of said openings for exposing the bait to the sight and smell of insects outside the container and to facilitate the entrance of the insects into said hollow member, said hollow member having its bottom wall formed with an opening interrupting the passage therethrough and providing an entrance to the interior of the container.

3. An insect trap comprising, a container to contain bait and having openings in opposing walls thereof, a hollow member extending between said walls and having its ends projecting through upper portions of said openings, screens extending across lower portions of said openings for exposing the bait to the sight and smell of insects outside the container and to facilitate the entrance of the insects into said hollow member, said hollow member having its bottom wall formed with an opening interrupting the passage therethrough and providing an entrance to the interior of the container, and obstruction plates depending from the bottom of the hollow member in spaced relation to said screens to prevent the return of the insects through the opening in the bottom wall of the hollow member.

4. An insect trap comprising, a container to contain bait, a hollow member opening through a wall of the container in spaced relation to the bottom thereof, said hollow member having its bottom wall formed with an opening providing an entrance to the interior of the latter, and means exteriorly of said wall and beneath said hollow member to facilitate the entrance of insects into the hollow member.

5. An insect trap comprising, a container to contain bait and including a pair of opposed walls, each provided with a pair of superposed openings, means aligned with the upper of said openings, secured within the container and extending from one of said walls to the other to provide a surface for the insects to walk upon, the upper of said openings providing entrances to said surface, said means formed with an opening interrupting said surface and providing an entrance to that portion of the container below said means, and means extending across the lower of said openings to facilitate the movement of the insect on the outside of said walls to the upper of said openings.

6. An insect trap comprising, a container to contain bait and having one of its walls provided with a pair of superposed openings, means secured within the container to provide a surface for insects to walk upon, the upper of said openings providing an entrance to said surface, said means formed to provide an entrance for that portion of the container below said surface, and means extending across the lower of said openings to facilitate the movement of insects on the outside of said wall to the upper of said openings.

In testimony whereof, I affix my signature hereto.

RALPH J. ARMSTRONG.